(12) United States Patent
Austria et al.

(10) Patent No.: US 11,594,875 B1
(45) Date of Patent: Feb. 28, 2023

(54) GROUND FAULT OVERVOLTAGE DETECTION USING NEGATIVE SEQUENCE VOLTAGE MONITORING

(71) Applicant: Pterra, LLC, Albany, NY (US)

(72) Inventors: Ricardo Austria, Albany, NY (US); Ketut Dartawan, Albany, NY (US)

(73) Assignee: Pterra, LLC, Albany, NY (US)

( * ) Notice: Subject to any disclaimer, the term of this patent is extended or adjusted under 35 U.S.C. 154(b) by 94 days.

(21) Appl. No.: 17/404,913

(22) Filed: Aug. 17, 2021

Related U.S. Application Data

(60) Provisional application No. 62/706,439, filed on Aug. 17, 2020.

(51) Int. Cl.
| | | |
|---|---|---|
| *H02H 7/00* | (2006.01) | |
| *H02H 7/26* | (2006.01) | |
| *H02H 1/00* | (2006.01) | |
| *H02J 3/38* | (2006.01) | |

(52) U.S. Cl.
CPC .......... *H02H 7/26* (2013.01); *H02H 1/0007* (2013.01); *H02H 1/0092* (2013.01); *H02J 3/381* (2013.01); *H02J 3/388* (2020.01); *H02J 2300/24* (2020.01)

(58) Field of Classification Search
None
See application file for complete search history.

(56) References Cited

U.S. PATENT DOCUMENTS

| | | | | |
|---|---|---|---|---|
| 5,349,490 | A | * | 9/1994 | Roberts .................. H02H 3/402 361/65 |
| 5,390,067 | A | * | 2/1995 | Eriksson ................ H02H 3/385 324/108 |
| 2016/0299187 | A1 | * | 10/2016 | Liang .................... H02H 1/0092 |
| 2021/0263092 | A1 | * | 8/2021 | Deneuville .......... G01R 31/088 |

\* cited by examiner

*Primary Examiner* — Stephen W Jackson
(74) *Attorney, Agent, or Firm* — STGIP, LLC; Shawn Gordon

(57) ABSTRACT

A negative sequence voltage (NSV) protection system is provided that can be added to existing equipment or included as a standalone device for detecting GFOV in electrical configurations connecting distributed energy resources to utility grids. The NSV protection system can be implemented at the low side of a distribution transformer of a typical distribution circuit or in a control system of inverter-based energy resources connected to a distribution feeder. The NSV protection system includes a passive monitoring system that outputs a trip signal when a potential GFOV is detected to occur. The trip signal can then be relayed to open the circuit breakers of a distribution circuit or to cause an inverter-based energy resource to trip offline.

12 Claims, 5 Drawing Sheets

GROUND FAULT OVERVOLTAGE DETECTION USING NEGATIVE SEQUENCE VOLTAGE MONITORING

FIELD OF THE INVENTION

The present invention generally relates to ground fault overvoltage detection and prevention. In particular, the present invention is directed to a system and method for ground fault overvoltage detection using negative sequence voltage monitoring.

BACKGROUND

A general desire to increase the amount of electrical energy produced and made available from renewable resources has spurred the development of, among other things, numerous projects for inverter-based energy generation sources, such as solar photovoltaic (PV) energy resources. These projects are typically connected to existing electrical distribution grids and may be required to meet certain conditions by the utility that owns and operates the distribution facilities.

However, these projects may be rejected or penalized because of the potential to cause a phenomenon known as ground fault overvoltage (GFOV). GFOV may arise when a PV project connects to a distribution circuit that previously had no or very low levels of PV or any other form of electrical power generation resource connected to the distribution circuit. One way of preventing GFOV is to implement a protection scheme based on measurement of zero sequence voltage (referred to herein as a "3V0 scheme").

GFOV can arise under certain electrical configurations (such as when the ratio of the distributed energy resources (DER) to load on the feeder is high or when the inverter anti-islanding protection fails to detect the faulted island), which are subject to a specific sequence of events. (In this context, a feeder is an electrical circuit that is part of the electric distribution system.) FIG. 1 depicts shows a typical prior art electrical configuration 10 for managing GFOV under a 3V0 scheme. An inverter-based generation source 12 is applying to interconnect to a distribution feeder system. There may be other customers and additional inverter-based energy sources connected to the same distribution feeder system (not shown for simplicity). Additional components include: a neutral line 11; electrical connections 13A-13E are configured for the rated voltage of the inverter output; electrical connections 14A-14D are configured for the high voltage level of the inverter transformer; low voltage windings 15 of inverter transformer; electrical connections 16A-16C that are distributor feeder from the inverter transformer to the substation transformer; distribution circuit breakers 17 (e.g., 17A-17C); high voltage windings 18 of the inverter transformer; distribution side windings 19 of the substation transformer; sub-transmission side windings 21 of the substation transformer; a high voltage substation 24; a substation transformer 25; sub-transmission circuit breakers 26 (e.g., 26A-26C); and HV bus 28 connecting to the external grid.

Substation transformer 25 is configured as a two-winding connected delta on the high (or sub-transmission) side 22 and wye-grounded on the low (or distribution) side 20. A sub-transmission line F (e.g., F1-F3) connects high side 22 of substation transformer 25 to a remote high-voltage (HV) substation 24. Circuit breakers 26 (e.g., 26A-26C) are provided on HV substation side 22 of sub-transmission line F, but not on the high side of the distribution substation 25. In addition, breakers 17A-17C, shown in closed position, are on the low-side of the distribution substation transformer 25. (On many systems, before the addition of DER to the distribution feeders, the sub-transmission line functioned as a radial feed to the distribution load; hence only one set of circuit breakers would be provided on the sub-transmission line, located on the sending end of HV substation line 28).

For the configuration shown in FIG. 1, a GFOV may arise from the following sequence of events:

a) A solid or low-impedance, single-line-to-ground (SLG) fault occurs at any of location on F1, F2, or F3.

b) The fault is detected by the sub-transmission protection, which then trips the HV breaker 26. This islands sub-transmission line 22 and connected distribution feeders 14. Normally, the island will de-energize if all the connected facilities are typical customer loads.

c) With sufficient amount of DER on the island, however, the island may stay energized with the fault still present. Other protection on the island, including those provided with the DER, particularly, inverter-based energy source 12, may fail to detect the fault and islanded condition, or the protection may detect the islanded condition but allow it to remain energized for a certain duration.

d) A form of temporary overvoltage (TOV), in particular a GFOV, then arises on the sub-transmission segment of the island. The duration that the GFOV remains can potentially be long enough to pose a safety risk to personnel and/or damage electrical devices and equipment.

FIG. 2 shows phasor diagrams for the sub-transmission voltage under various stages of the above sequence of events. Before the SLG fault occurs, the three phase voltages (i.e., $V_{AN}$, $V_{BN}$, $V_{CN}$) are nominal at 1.0 per unit (PU). When a SLG fault occurs on phase A and the breaker at the HV substation has not yet opened (second diagram), voltage on the grounded phase is, at worst, zero, hence, $V_{AN}=0$, while the unfaulted phases remain nominal, hence, $V_{BN}=V_{CN}=1$ PU. In the third diagram, HV substation breaker has opened and the sub-transmission voltage no longer has a grounding source which causes the neutral point, N, to shift. In this situation, the voltages on the unfaulted phases are $V_{BN}=V_{CN}=1.732$ PU. This high voltage is what is referred to as GFOV. The GFOV remains in place as long as there is excitation from the low side of the substation transformer and lightning arresters do not start to conduct. Furthermore, actual GFOV will have transient and non-fundamental components with complex waveshapes.

Since the voltage on the low side, where the inverter-based PV are connected, remains normal with the SLG fault still connected and after the HV breaker has opened, the connected DER may not recognize that there is a GFOV event on the high side. Some existing systems are able to recognize either the islanded condition or the presence of a fault and, in response, do trip the DER, while others do not and stay online, continuing to energize the GFOV. Due to this uncertainty in the actual response of inverter-based DER, an additional protection scheme may be used.

One such protection scheme is the 3V0 scheme. An example of one such 3V0 scheme is shown in FIG. 1 that includes a potential transformer 30, which includes a voltage transducer 34. The 3V0 scheme is connected to sub-transmission side 22 of substation transformer 25 via phase connections 35, 37, 39, which connect 3Vo transformer 30 to sub-transmission lines F. The measured 3V0 voltage is processed through logic circuits 33 and triggers a ground fault overvoltage relay, which then provides a trip signal to the breakers 17 (e.g., 17A-17C) on the distribution side 20 of substation transformer 25 via connector 32. These 3V0 schemes, however, require substantial construction at the substation and can take from 6-12 months to implement at substantial cost. Thus, there is a need for a GFOV protection scheme that is both effective and can be implanted relatively quickly and cost effectively.

SUMMARY OF THE DISCLOSURE

A system for ground fault overvoltage detection using negative sequence voltage monitoring includes a distributed enemy source configured to be connected to an energy grid, an inverter transformer between the distributed energy source and the grid, a plurality of electrical connectors between the distributed energy source and the inverter transformer, a plurality of circuit breakers on respective ones of the plurality of electrical connectors between the distributed energy source and the inverter transformer, a plurality of negative sequence voltage monitoring electrical connectors attached to respective ones of the plurality of electrical connectors between the distributed energy source and the inverter transformer, and a processor connected to the plurality of negative sequence voltage monitoring electrical connectors. When the processor determines that an increase in a negative sequence voltage has occurred based on input from at least one of the plurality of negative sequence voltage monitoring electrical connectors, at least one of the plurality of circuit breakers is tripped if a ratio of an incremental change for negative sequence voltage to an incremental change for positive sequence voltage exceeds a first threshold value and then the ratio exceeds a second threshold value for a predetermined time and a passive anti-islanding technique identifies an islanding condition within a maximum operating time of an upstream circuit breaker.

In another aspect of the invention, a system for ground fault overvoltage detection using negative sequence voltage monitoring includes a sensor for monitoring a negative sequence voltage on a distribution side of an electrical configuration having a distributed energy source connected to a grid and a circuit breaker on the distribution side positioned between the distributed energy source and a substation transformer. When the sensor detects an increase in the negative sequence voltage, the circuit breaker is tripped if a ratio of an incremental change for negative sequence voltage to an incremental change for positive sequence voltage exceeds a first threshold value and then the ratio exceeds a second threshold value for a predetermined time and a passive anti-islanding technique identifies an islanding condition within a maximum operating time of an upstream circuit breaker, and wherein the second threshold value is lower than the first threshold value.

In another aspect of the invention, a method for ground fault overvoltage detection using negative sequence voltage monitoring includes monitoring negative sequence voltage on a distribution side of and electrical configuration having a distributed energy source connected to a grid for an increase in voltage above a threshold amount within a period of time, determining an incremental change for negative sequence voltage on the distribution side and an incremental change for positive sequence voltage on the distribution side if the increase is detected, calculating a ratio of the incremental change for negative sequence voltage to the incremental change for positive sequence voltage, activating a timer if the ratio exceeds a first threshold value, incrementing the timer so long as the ratio exceeds a second threshold value, activating, if the timer is incremented beyond a predetermined time, a passive anti-islanding technique, and outputting a trip signal if the anti-islanding technique identifies an islanding condition within a maximum operating time of an upstream circuit breaker.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
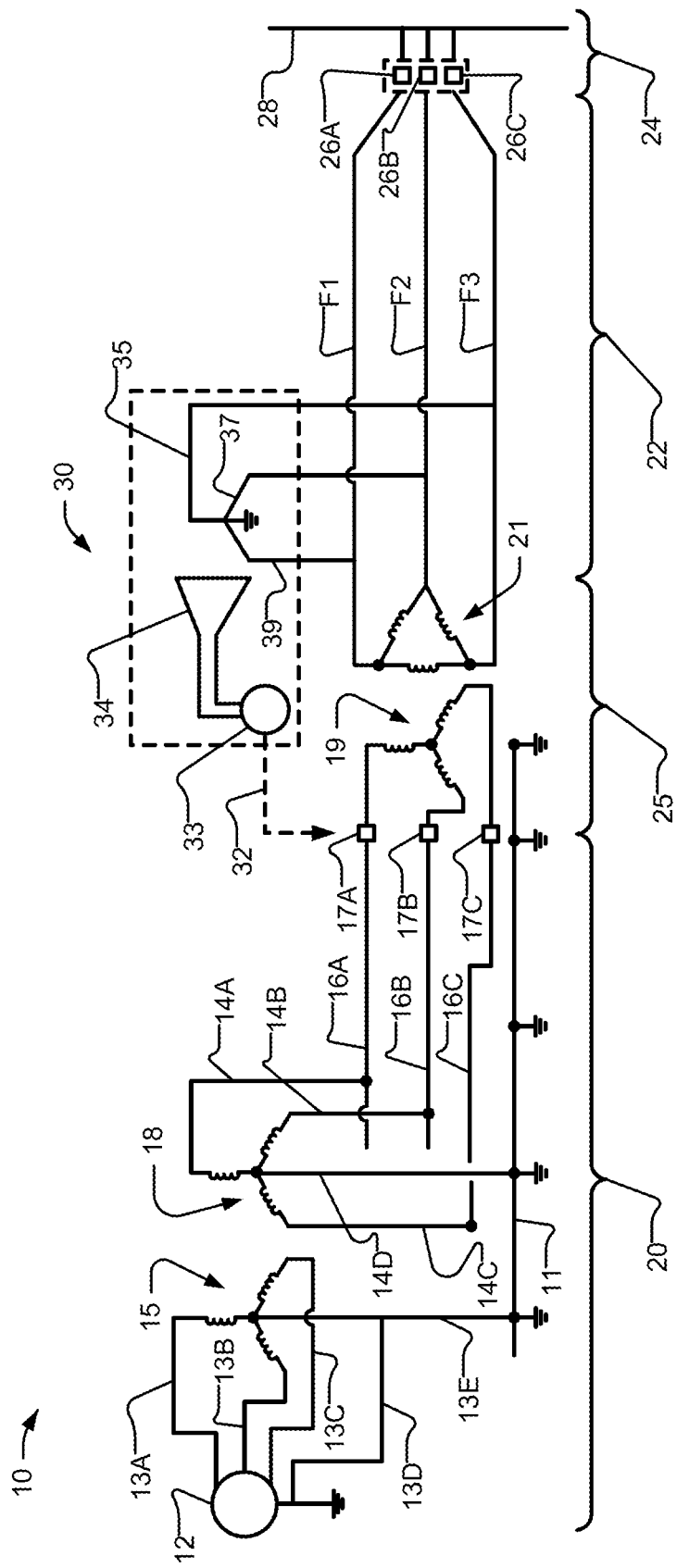
FIG. 1 (prior art) is a schematic diagram for an electrical configuration with a 3V0 protection scheme for a GFOV.
Figure 2:
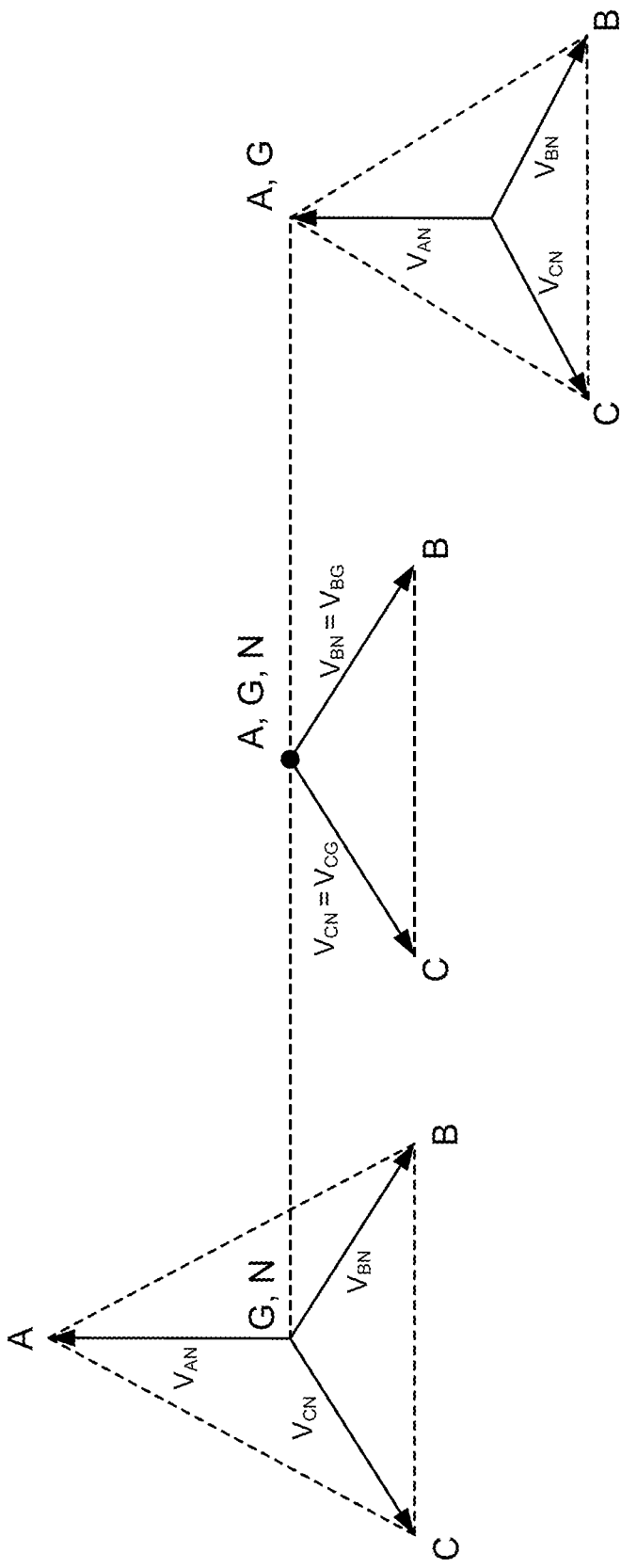
FIG. 2 is a phasor diagram for a sub-transmission voltage under various stages of a GFOV event.

A negative sequence voltage (NSV) protection system is provided that can be added to existing equipment or included as a standalone device for detecting GFOV in electrical configurations connecting DER to utility grids. The NSV protection system can be implemented at the low side of a distribution transformer of a typical distribution circuit or in a control system of inverter-based energy resources connected to a distribution feeder. The NSV includes a passive monitoring system that outputs a trip signal when a potential GFOV is detected. The trip signal can then be relayed to open the circuit breakers of a distribution circuit or to cause an inverter-based energy resource to trip offline.

Compared to a 3V0 protection scheme, the NSV protection system does not require equipment or monitoring on the high side of a substation transformer and can provide a faster response since the NSV protection system uses precursor conditions to detect an emerging GFOV rather than waiting for an actual GFOV to occur. By placing all of the monitoring requirements on the distribution side, the NSV protection system conducts monitoring without need for the high cost of high voltage potential transformers and can be flexibly located anywhere along the distribution circuit or at the distribution substation. The NSV protection system can be implemented as part of existing equipment, such as protection relays and power plant controllers for inverter-based generation, or can be provided as a compact stand-alone device. This allows for implementation without need of substation construction, in contrast to 3V0 schemes. In addition, the NSV protection scheme is less prone to over sensitivity (such as nuisance tripping) or under sensitivity (such as failing to detect the onset or presence of GFOV).

In an exemplary embodiment, an NSV protection system monitors the positive and negative sequence voltages on a distribution circuit. The NSV protection system is configured to detect the following sequence of events:

a) A sudden increase in the negative sequence voltage and a sudden drop in positive sequence voltage. In an exemplary embodiment, the increase and drop are essentially simultaneous, and may last for about 0.02 seconds.
b) The ratio of incremental negative sequence voltage to incremental positive sequence voltage is near unity.
c) This ratio of incremental negative sequence voltage to incremental positive sequence voltage remains near unity for a certain duration, and then the negative sequence voltage shows a sudden decrease. For example, the ratio may be near unity for about 0.2 to 0.3 seconds, at which point the positive and negative sequences return to about the levels they were before the events of (a).

Once the above sequence of events is detected and confirmed via a timer, a check for islanding is initiated. This is a passive islanding detection technique in that no perturbations are applied to the feeder voltage and current. Once the NSV protection scheme confirms conditions are present for GFOV, a trip signal is output.

Figure 3:
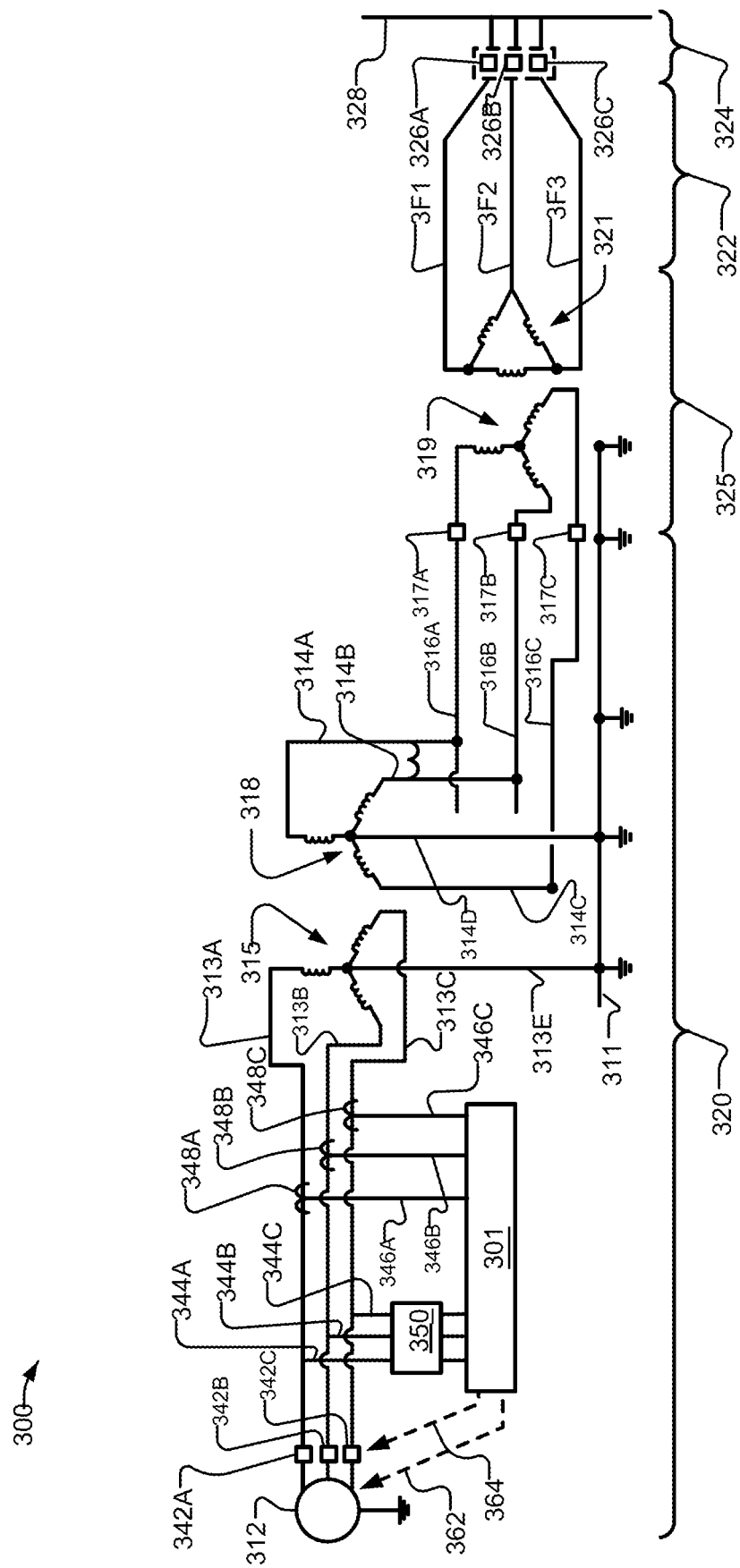
FIG. 3 is a schematic diagram for an electrical configuration with a negative sequence voltage protection system for a GFOV in accordance with an embodiment of the present invention.

An electrical configuration 300 is shown in FIG. 3 that includes a distributed energy source connected to a grid with an NSV protection system 301 connected on a distribution side 320. As can be seen in FIG. 3, and in contrast to the 3V0 system discussed above, the NSV protection system has all monitoring requirements on a distribution side 320 of a substation transformer 325. An inverter-based generation source 312 may be interconnected to a distribution feeder system in configuration 300, which may further include: a neutral line 311; electrical connections 313A, 313B, 313C, 313E, which are configured for the rated voltage of the inverter output; electrical connections 314A-314D are configured for the high voltage level of the inverter transformer; low voltage windings 315 of inverter transformer; electrical connections 316A-316C that are distributor feeder from the inverter transformer to the substation transformer; distribution circuit breakers 317 (e.g., 317A-317C); high voltage windings 318 of the inverter transformer; distribution side windings 319 of the substation transformer; sub-transmission side windings 321 of the substation transformer; a high voltage substation 324; a substation transformer 325; sub-transmission circuit breakers 326 (e.g., 326A-326C); and HV bus 328 connecting to the external grid.

Substation transformer 325 is configured as a two-winding connected delta on the high (or sub-transmission) side 322 and wye-grounded on the low (or distribution) side 320. A sub-transmission line 3F (e.g., 3F1-3F3) connects high side 322 of substation transformer 325 to a remote high-voltage (HV) substation 324. Circuit breakers 326 (e.g., 326A-326C) are provided on HV substation side 322 of sub-transmission line 3F, but not on the high side of the distribution substation 325. In addition, breakers 317A-317C, shown in closed position, are on the low-side of the distribution substation transformer 325.

In addition, NSV system 301 is connected to electrical connections 313A, 313B, and 313C via respective electrical connections 348A, 348B, and 348C. NSV system 301 is also connected to a potential transformer 350, which measures currents and/or voltages, to electrical connections 313A, 313B, and 313C via respective electrical connections 344A, 344B, and 344C closer to inverter-based generation source 312. Circuit breakers 342A, 342B, and 342C are on electrical connections 313A, 313B, and 313C. Trip signals, when required as determined by NSV system 301 based on signals monitored on distribution side 320, may be sent to circuit breakers 342 via a connection 364 and/or to inverter-based generation source 312 via a connection 362. Connections 363, 364 may be of any suitable type.

Figure 4:
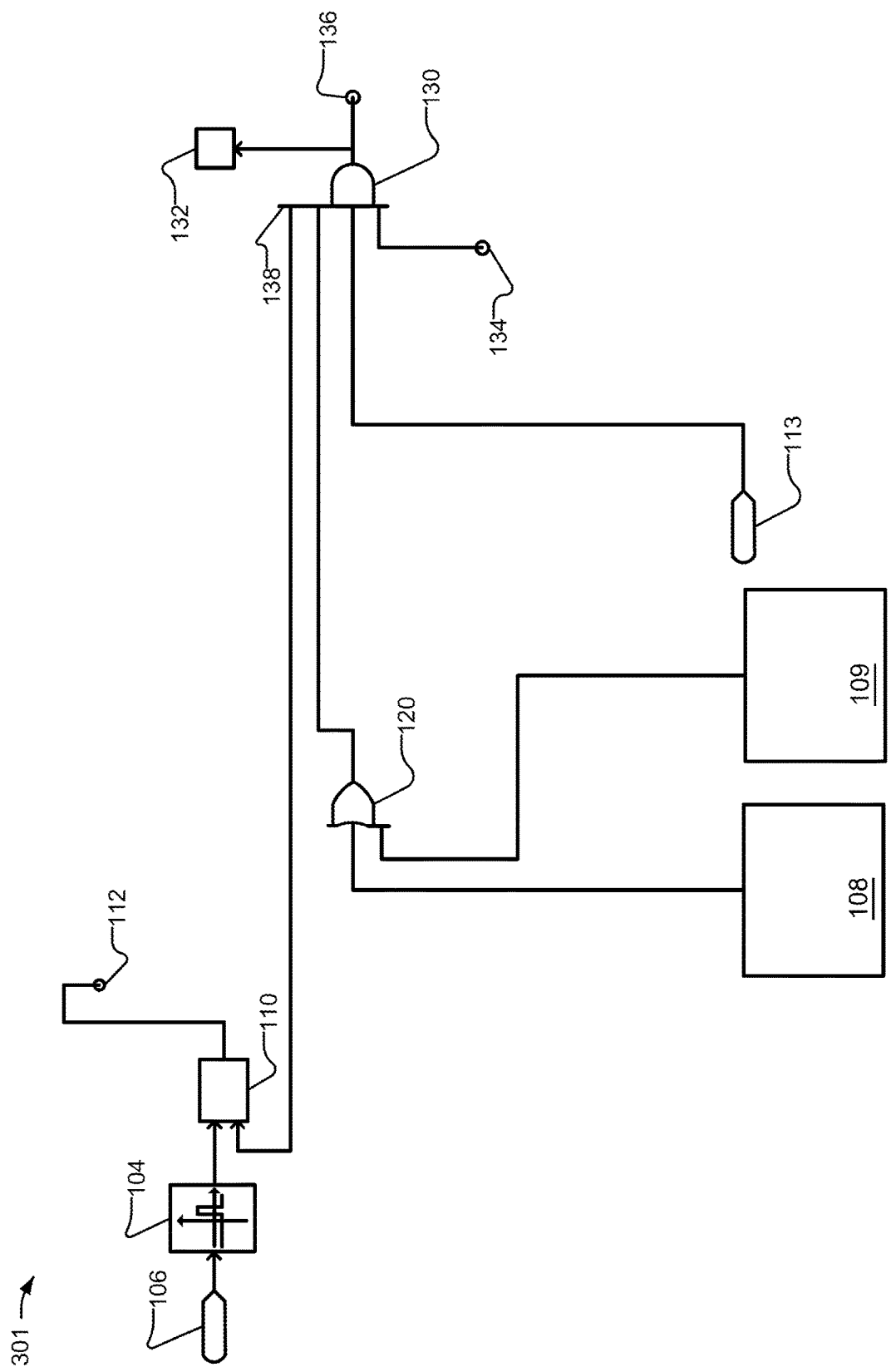
FIG. 4 is an overview of a negative voltage protection scheme in accordance with an embodiment of the present invention.

An example of NSV protection system 301 is shown in FIG. 4. NSV protection scheme 301 monitors electrical activity on the distribution side of an electrical configuration with a distributed energy source connected to a grid and detects whether a GFOV is likely to be occurring based on that monitoring. Monitored electrical parameters are received at component 132 and sent to a logical processor 130. Summing junction bus 138 interconnects components of system 301 and a fault detection logic center 106 receives inputs from component 132 as well as a value of setting for time from device 104, a value setting for the minimum operating time of an upstream circuit breaker from component 112, and a time delay from component 110 to determine whether a fault may be occurring. If so, additional analysis is performed (as described more below) utilizing threshold values and voltage change ratios based on values set and stored at test points 134 and 113. If a GFOV event is likely, then it is determined whether an islanding condition is occurring via a first islanding detection logic 108 and a second islanding logic 109 facilitated via logical processor 120. Depending on the current determined state, an output signal for breaker status is adjusted at test point 136.

Figure 5:
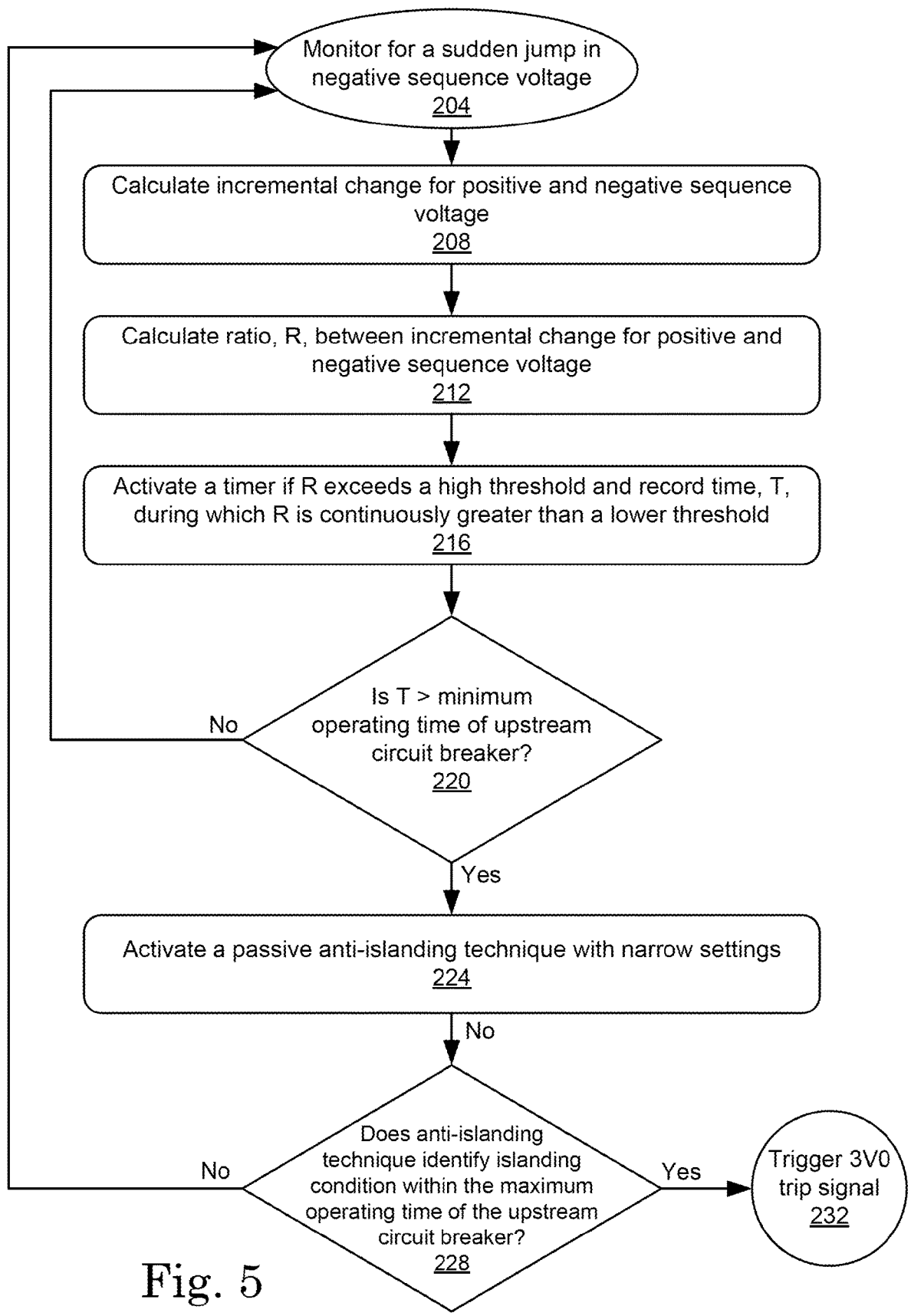
FIG. 5 is a process diagram outlining a negative sequence voltage protection scheme in accordance with an embodiment of the present invention.

In FIG. 5, a process diagram for providing such an NSV protection scheme is shown. The low-side negative sequence voltage of an electrical configuration is continuously monitored. Each monitored value of the low-side negative sequence voltage is compared at step 204 with a moving mean, M, which is calculated over one cycle of negative sequence voltage to provide the mean of the monitored value. The comparison is conducted to detect sudden changes in negative sequence voltage. If M exceeds a threshold value, $Th_1$, that is, a jump is detected on the negative sequence voltage, then step 208 is performed.

At step 208, the positive sequence voltage is sampled and the incremental change of positive and negative sequence voltages are calculated (that is, the differences between pre-jump and post-jump values). At step 212, a ratio, R, is calculated of absolute values of negative sequence voltage to positive sequence voltage changes. If the value of R approaches a threshold value, $Th_2$ (e.g., R>0.8), representing the ratio above which an SLG fault on the high side may have occurred, then a timer is activated at step 216. The timer records the time, t, during which R is continuously greater than a lower threshold, $Th_3$ (e.g., R>0.4). In other words, the timer is deactivated if R drops below $Th_3$, which represents the value below which the SLG fault is not likely to lead to GFOV. If, on the other hand, t exceeds a set value, $t_1$, then this is flagged as a potential GFOV. The value of $t_1$ is based on the time from when a fault occurs to the fastest time that the HV breaker can open.

At decision 220, it is determined whether t is greater than the minimum operating time of an upstream circuit breaker, $t_1$ (e.g., t>time required for 5 cycles). If t is not greater than the minimum operating time of an upstream circuit breaker, step 204 is returned to and the low-side negative sequence voltage is again monitored. If t is greater than the minimum operating time of an upstream circuit breaker, then an anti-islanding technique is activated with narrow settings at step 224. At decision 228, it is determined whether the activated anti-islanding technique has identified an islanding condition within the maximum operating time of the upstream circuit breaker. If no islanding condition has been identified, step 204 is returned to and the low-side negative sequence voltage is again monitored. If an islanding condition is identified, a trip signal is triggered for 3V0 at step 232.

Because IEEE Standard 1547-2018 requires that DER remain online during frequency and voltage excursions, it is necessary while implementing an NSV protection scheme to check whether the grid still requires the DER to remain online. The check for this requirement is an islanding condition because if the section of the electrical system where the GFOV may appear is already islanded (i.e., separated from the main grid), then the DER can no longer contribute to grid frequency and voltage control. For this reason, the NSV protection system if preferably equipped with a "remote islanding" detection logic. Remote islanding occurs when the HV breaker opens. The NSV protection system may use a passive detection method to identify a remote island. If remote islanding is confirmed, the NSV protection system sends a trip signal to the DER that NSV protection system is connected to.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for ground fault overvoltage detection using negative sequence voltage monitoring comprising:
   a distributed energy source configured to be connected to an energy grid;
   an inverter transformer between the distributed energy source and the grid;
   a plurality of electrical connectors between the distributed energy source and the inverter transformer;
   a plurality of circuit breakers on respective ones of the plurality of electrical connectors between the distributed energy source and the inverter transformer;
   a plurality of negative sequence voltage monitoring electrical connectors attached to respective ones of the plurality of electrical connectors between the distributed energy source and the inverter transformer; and
   a processor connected to the plurality of negative sequence voltage monitoring electrical connectors,
   wherein, when an increase in a negative sequence voltage has occurred based on input to the processor from at least one of the plurality of negative sequence voltage monitoring electrical connectors, at least one of the plurality of circuit breakers is tripped if a ratio of an incremental change for negative sequence voltage to an incremental change for positive sequence voltage exceeds a first threshold value and then the ratio exceeds a second threshold value for a predetermined time and a passive anti-islanding technique identifies an islanding condition within a maximum operating time of an upstream circuit breaker.

2. The system of claim 1, wherein the second threshold value is lower than the first threshold value.

3. The system of claim 1, wherein the distributed energy source is a photovoltaic energy source.

4. The system of claim 1, wherein the first threshold value is 0.8 and the second threshold value is 0.4.

5. The system of claim 1, wherein the predetermined time is greater than a minimum operating time of an upstream circuit breaker.

6. The system of claim 1, further including a potential transformer connected to the plurality of electrical connectors between the distributed energy source and the inverter transformer and the processor.

7. A system for ground fault overvoltage detection using negative sequence voltage monitoring comprising:
   a sensor for monitoring a negative sequence voltage on a distribution side of an electrical configuration having a distributed energy source connected to a grid; and
   a circuit breaker on the distribution side positioned between the distributed energy source and a substation transformer,
   wherein, when the sensor detects an increase in the negative sequence voltage, the circuit breaker is tripped if a ratio of an incremental change for negative sequence voltage to an incremental change for positive sequence voltage exceeds a first threshold value and then the ratio exceeds a second threshold value for a predetermined time and a passive anti-islanding technique identifies an islanding condition within a maximum operating time of an upstream circuit breaker, and wherein the second threshold value is lower than the first threshold value.

8. A method for ground fault overvoltage detection using negative sequence voltage monitoring comprising:
   monitoring negative sequence voltage on a distribution side of and electrical configuration having a distributed energy source connected to a grid for an increase in voltage above a threshold amount within a period of time;
   determining an incremental change for negative sequence voltage on the distribution side and an incremental change for positive sequence voltage on the distribution side if the increase is detected;
   calculating a ratio of the incremental change for negative sequence voltage to the incremental change for positive sequence voltage;
   activating a timer if the ratio exceeds a first threshold value;
   incrementing the timer so long as the ratio exceeds a second threshold value;
   activating, if the timer is incremented beyond a predetermined time, a passive anti-islanding technique; and
   outputting a trip signal if the anti-islanding technique identifies an islanding condition within a maximum operating time of an upstream circuit breaker.

9. The method of claim 8, wherein the second threshold value is lower than the first threshold value.

10. The method of claim 8, wherein the distributed energy source is a photovoltaic energy source.

11. The method of claim 8, wherein the first threshold value is 0.8 and the second threshold value is 0.4.

12. The method of claim 8, wherein the predetermined time is greater than a minimum operating time of an upstream circuit breaker.

* * * * *